US012033775B2

(12) United States Patent
Kirk et al.

(10) Patent No.: US 12,033,775 B2
(45) Date of Patent: Jul. 9, 2024

(54) VARISTOR ARRAY INCLUDING MATCHED VARISTORS

(71) Applicant: KYOCERA AVX Components Corporation, Fountain Inn, SC (US)

(72) Inventors: Michael W. Kirk, Simpsonville, SC (US); Marianne Berolini, Greer, SC (US); Palaniappan Ravindranathan, Simpsonville, SC (US)

(73) Assignee: KYOCERA AVX Components Corporation, Fountain Inn, SC (US)

( * ) Notice: Subject to any disclaimer, the term of this patent is extended or adjusted under 35 U.S.C. 154(b) by 9 days.

(21) Appl. No.: 17/692,284

(22) Filed: Mar. 11, 2022

(65) Prior Publication Data

US 2022/0293306 A1 Sep. 15, 2022

Related U.S. Application Data

(60) Provisional application No. 63/159,514, filed on Mar. 11, 2021.

(51) Int. Cl.

*H01C 7/112* (2006.01)
*H01C 1/14* (2006.01)
*H01C 7/18* (2006.01)

(52) U.S. Cl.

CPC ............... *H01C 7/112* (2013.01); *H01C 1/14* (2013.01); *H01C 7/18* (2013.01)

(58) Field of Classification Search

CPC ............. H01C 7/112; H01C 7/18; H01C 1/14
See application file for complete search history.

(56) References Cited

U.S. PATENT DOCUMENTS 4,513,350 A 4/1985 Coleman
7,705,708 B2 4/2010 Matsuoka et al.
10,529,472 B2 * 1/2020 Kirk ....................... H01C 1/142
(Continued)

FOREIGN PATENT DOCUMENTS

EP 1 946 340 B1 12/2016
EP 1946340 B1 * 12/2016 ........... H01C 7/1006
(Continued)

OTHER PUBLICATIONS

EP-1946340 machine translation. (Year: 2006).*
International Search Report and Written Opinion for PCT/US2022/019878 dated Jun. 27, 2022, 11 pages.

*Primary Examiner* — Kyung S Lee
(74) *Attorney, Agent, or Firm* — Dority & Manning, P.A.

(57) ABSTRACT

A varistor array can include a monolithic body including a plurality of dielectric layers. A first varistor can be formed in the monolithic body. The first varistor can include a first external terminal on a first end of the monolithic body, a first plurality of electrodes connected with the first external terminal, a second external terminal on a second end of the monolithic body, and a second plurality of electrodes connected with the second external terminal. The second plurality of electrodes can be interleaved with the first plurality of electrodes and can overlap the first plurality of electrodes at an overlapping area that is insensitive to a relative misalignment between the first plurality of electrodes and the second plurality of electrodes when the misalignment is less than a threshold. A second varistor can be formed in the monolithic body that is distinct from the first varistor.

21 Claims, 9 Drawing Sheets

(56) References Cited

U.S. PATENT DOCUMENTS

| | | | | |
|---|---|---|---|---|
| 10,937,575 | B2 * | 3/2021 | Kirk | H01C 1/14 |
| 11,670,453 | B2 * | 6/2023 | Ellmore | H01C 10/00 361/321.2 |
| 2007/0041141 | A1 | 2/2007 | Deng | |
| 2011/0317328 | A1 | 12/2011 | Taniguchi et al. | |
| 2014/0138137 | A1 | 5/2014 | Kwag | |
| 2020/0343046 | A1 * | 10/2020 | Hodgkinson | H01G 4/12 |

FOREIGN PATENT DOCUMENTS

| | | | |
|---|---|---|---|
| JP | S 56149348 | U | 11/1981 |
| JP | S 57175247 | U | 11/1982 |
| JP | H 04280615 | A | 10/1992 |
| JP | H 05243007 | A | 9/1993 |
| JP | H 07263270 | A | 10/1995 |
| JP | 2000331805 | A | 11/2000 |
| JP | 2002184608 | A | 6/2002 |
| JP | 2009004466 | A | 1/2009 |
| JP | 2012209493 | A | 10/2012 |
| KR | 100711092 | B1 | 4/2007 |
| WO | WO 2014/139696 | A1 | 9/2014 |

* cited by examiner

VARISTOR ARRAY INCLUDING MATCHED VARISTORS

CROSS REFERENCE TO RELATED APPLICATION

The present application claims filing benefit of U.S. Provisional Patent Application Ser. No. 63/159,514 having a filing date of Mar. 11, 2021, which is incorporated herein by reference in its entirety.

BACKGROUND OF THE INVENTION

The present subject matter generally relates to electronic components adapted to be mounted on a circuit board and more particularly to a varistor array.

Multilayer ceramic devices, such as varistor arrays, are typically constructed with a plurality of stacked dielectric-electrode layers. During manufacture, the layers may often be pressed and formed into a vertically stacked structure. Multilayer ceramic devices can include a single component or multiple components in an array.

Varistors are voltage-dependent nonlinear resistors and have been used as surge absorbing electrodes, arresters, and voltage stabilizers. Varistors may be connected, for example, in parallel with sensitive electrical components. The non-linear resistance response of varistors is often characterized by a parameter known as the clamping voltage. For applied voltages less than the clamping voltage of a varistor, the varistor generally has very high resistance and, thus, acts similar to an open circuit. When the varistor is exposed to voltages greater than its clamping voltage, however, its resistance is reduced such that the varistor acts more similar to a short circuit and allows a greater flow of current. This non-linear response may be used to divert current surges and/or prevent voltage spikes from damaging sensitive electronic components.

Some applications can benefit from two or more varistors having closely matches characteristics, such as capacitance. Separate varistors, however, generally do not have sufficiently similar characteristics.

SUMMARY OF THE INVENTION

In accordance with one embodiment of the present disclosure, a varistor array can include a monolithic body including a plurality of dielectric layers stacked in a Z-direction that is perpendicular to a longitudinal direction. The monolithic body can have a first end and a second end that is spaced apart from the first end in the longitudinal direction. A first varistor can be formed in the monolithic body. The first varistor can include a first external terminal on the first end of the monolithic body, a first plurality of electrodes connected with the first external terminal, a second external terminal on the second end of the monolithic body, and a second plurality of electrodes connected with the second external terminal. The second plurality of electrodes can be interleaved with the first plurality of electrodes and can overlap the first plurality of electrodes at an overlapping area that is insensitive to a relative misalignment between the first plurality of electrodes and the second plurality of electrodes when the misalignment is less than a threshold. A second varistor can be formed in the monolithic body. The second varistor can be distinct from the first varistor and can include a first external terminal on the first end of the monolithic body and a second external terminal on the second end of the monolithic body.

In accordance with another embodiment of the present disclosure, a varistor array can include a monolithic body including a plurality of dielectric layers stacked in a Z-direction that is perpendicular to a longitudinal direction. The monolithic body can have a first end and a second end that is spaced apart from the first end in the longitudinal direction. A first varistor can be formed in the monolithic body, and a second varistor can be formed in the monolithic body and distinct from the first varistor. The first varistor can include a first external terminal on the first end of the monolithic body, a first plurality of active electrodes connected with the first external terminal, a second external terminal on the second end of the monolithic body, and a second plurality of active electrodes connected with the second external terminal. Respective active electrodes of the second plurality of active electrodes can be co-planar with respective active electrodes of the first plurality of active electrodes. A plurality of floating electrodes can overlap the first plurality of active electrodes along a first overlapping area that is insensitive to a relative misalignment between the first plurality of active electrodes and the plurality of floating electrodes. The floating electrodes can overlap the second plurality of active electrodes along a second overlapping area that is insensitive to the relative misalignment between the second plurality of active electrodes and the plurality of floating electrodes less than a threshold.

In accordance with another embodiment of the present disclosure, a varistor array can include a monolithic body comprising a plurality of dielectric layers stacked in a Z-direction that is perpendicular to a longitudinal direction. The monolithic body can have a first end and a second end that is spaced apart from the first end in the longitudinal direction. A first varistor can be formed in the monolithic body. The first varistor can include a first external terminal at the first end of the monolithic body and a second external terminal at the second end of the monolithic body, a first plurality of electrodes connected with the first external terminal, and a second plurality of electrodes connected with the second external terminal. The second plurality of electrodes of the first varistor can be interleaved with the first plurality of electrodes of the first varistor and overlap the first plurality of electrodes of the first varistor at a first overlapping area. A second varistor can be formed in the monolithic body. The second varistor can be distinct from the first varistor and can include a first external terminal at the first end of the monolithic body and a second external terminal at the second end of the monolithic body. A first plurality of electrodes can be connected with the first external terminal. A second plurality of electrodes can be connected with the second external terminal. The second plurality of electrodes of the second varistor overlapping the first plurality of electrodes of the second varistor at a second overlapping area. A ratio of the first overlapping area to the second overlapping area can range from 0.9 to 1.1.

BRIEF DESCRIPTION OF THE DRAWINGS

A full and enabling disclosure of the present subject matter, including the best mode thereof, directed to one of ordinary skill in the art, is set forth in the specification, which makes reference to the appended Figures, in which.

Figure 1A:
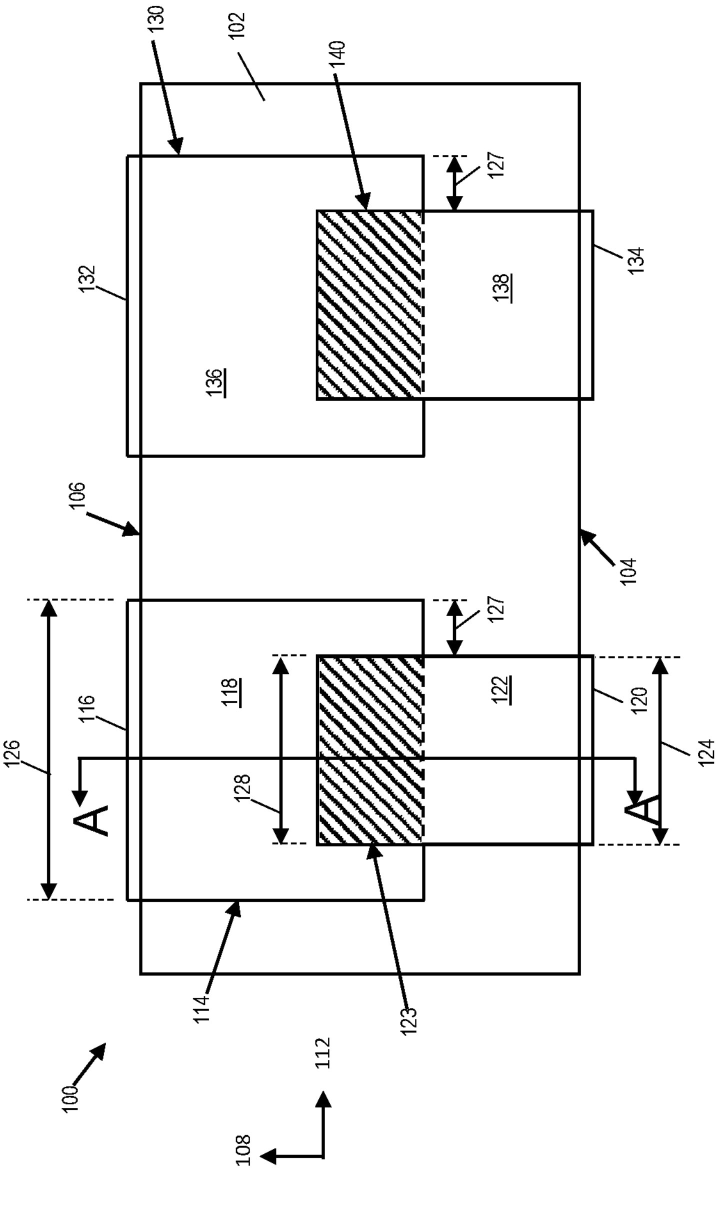
FIG. 1A is a simplified top-down view of a varistor array according to aspects of the present disclosure.

Repeat use of reference characters throughout the present specification and appended drawings is intended to represent same or analogous features, electrodes, or steps of the present subject matter.

DETAILED DESCRIPTION OF THE PREFERRED EMBODIMENTS

It is to be understood by one skilled in the art that the present disclosure is a description of exemplary embodiments only and is not intended as limiting the broader aspects of the present subject matter, which broader aspects are embodied in the exemplary constructions.

Generally, the present disclosure is directed to a varistor array having two or more varistors. The varistors can have closely matched electrical performance characteristics, such as capacitance, insertion loss, and the like. During manufacturing slight misalignment between various layers of multilayer ceramic components can cause slight variations in sizes of overlapping areas between electrodes. However, a varistor array according to aspect of the present disclosure can provide two or more varistors having alignment-insensitive overlapping areas. As a result, the varistor array can exhibit capacitance values and/or other electrical performance characteristics that are closely matched to each other despite small misalignment of various layers that may occur during manufacturing of the varistor array.

For example, the varistor array can include a first varistor having overlapping electrodes that overlap along a first overlapping area and a second varistor having overlapping electrodes that overlap along a second overlapping area. A ratio of the first overlapping area to the second overlapping area may range from about 0.9 to about 1.1, in some embodiments from about 0.92 to about 1.08, in some embodiments from about 0.94 to about 1.06, in some embodiments from about 0.96 to about 1.04, and in some embodiments from about 0.98 to about 1.02. However, in alternative embodiments, the ratio of the first overlapping area to the second overlapping area may be any suitable number as desired by design considerations.

For example, varistors of the varistor array can include electrodes having a suitable geometric configuration such that their respective overlapping areas are insensitive to small misalignments between the various layers. In other words, small misalignments can have little to no effect on the absolute sizes of the first overlapping area and the second overlapping area and/or on the ratio between the first overlapping area and the second overlapping area. As a result, the varistor array can include multiple distinct varistors that have closely controlled overlapping areas, which can provide very closely matched performance characteristics.

A varistor array according to aspects of the present disclosure can include a monolithic body including a plurality of dielectric layers stacked in a Z-direction. The varistor array can include a first varistor formed in the monolithic body. The first varistor may include a first external terminal on a first end of the monolithic body. The first varistor may include a first plurality of electrodes connected with the first external terminal. The first varistor may include a second external terminal on the second end of the monolithic body. The first varistor may include a second plurality of electrodes connected with the second external terminal. The second plurality of electrodes may be interleaved with the first plurality of electrodes and may overlap the first plurality of electrodes at an overlapping area that is insensitive to a relative misalignment between the first plurality of electrodes and the second plurality of electrodes when the misalignment is less than a threshold.

For example, the second plurality of electrodes can have a width in the lateral direction that is greater than a width of the first plurality of electrodes in the lateral direction. A width of the overlapping area between the first plurality of electrodes and the second plurality of electrodes can be equal to the width of the first plurality of electrodes. Alternatively, the width of the second plurality of electrodes can be less than the width of the first plurality of electrodes. The width of the overlapping area between the first plurality of electrodes and the second plurality of electrodes can be equal to the width of the second plurality of electrodes.

A second varistor may be formed in the monolithic body. The second varistor may be distinct from the first varistor. For example, the second varistor can be free of internal electrodes (e.g., floating electrodes, active electrodes etc.) that are included in the first varistor. The second varistor can be free of external terminals that are included in and/or connected with the first varistor. Further, the second varistor be spaced apart from the first varistor in the lateral direction.

The first varistor can include a first external terminal on the first end of the monolithic body and a second external terminal on the second end of the monolithic body. The second varistor can include a first plurality of electrodes connected with the first external terminal and a second plurality of electrodes connected with the second external terminal. The second plurality of electrodes of the second varistor may overlap the first plurality of electrodes of the second varistor at an overlapping area that is insensitive to a relative misalignment between the first plurality of electrodes of the second varistor and the second plurality of electrodes of the second varistor when the misalignment is less than the threshold.

The varistor array can include two varistors as described herein. However, in some embodiments, the varistor array can include 4 or more varistors, in some embodiments 6 or more varistors, in some embodiments 8 or more varistors, and in some embodiments 10 or more varistors.

In some embodiments, a total overlapping area of the first varistor can be within about 10% or less of a total overlapping area of the second varistor, in some embodiments within about 5% or less, in some embodiments within about 3% or less, in some embodiments within about 2% or less, in some embodiments within about 1% or less, and in some embodiments within about 0.5% or less.

One or more of the varistors may exhibit a capacitance of less than 50 pF with a DC bias of 0.0 volts and a 0.5 volt root-mean-squared sinusoidal signal at an operating frequency of 1 MHz, a temperature of about 23° C., and a relative humidity of 25%. For example, the first varistor may exhibit a first capacitance, and the second varistor can exhibit a second capacitance that is within 5% of the first capacitance exhibited by the first varistor.

According to aspects of the present disclosure, a varistor array can include floating electrodes. The varistor array can include a monolithic body including a plurality of dielectric layers stacked in a Z-direction. A first varistor may be formed in the monolithic body, and a second varistor may be formed in the monolithic body that is distinct from the first varistor.

The first varistor can include a first external terminal on a first end of the monolithic body and a first plurality of active electrodes connected with the first external terminal. The first varistor can include a second external terminal on the second end of the monolithic body. A second plurality of active electrodes may be connected with the second external terminal. Respective active electrodes of the second plurality of active electrodes may be co-planar with respective active electrodes of the first plurality of active electrodes. A plurality of floating electrodes may overlap the first plurality of active electrodes along a first overlapping area that is insensitive to a relative misalignment between the first plurality of active electrodes and the plurality of floating electrodes. The floating electrodes may overlap the second plurality of active electrodes along a second overlapping area that is insensitive to the relative misalignment between the second plurality of active electrodes and the plurality of floating electrodes less than a threshold.

For example, the plurality of floating electrodes may have a width in the lateral direction that is greater than a width of the first plurality of active electrodes in the lateral direction such that a width of the first overlapping area between the plurality of floating electrodes and the first plurality of active electrodes is equal to the width of the first plurality of active electrodes. As another example, the floating electrodes can have a width in the lateral direction that is less than a width of the first plurality of active electrodes in the lateral direction such that a width of a first overlapping area between the plurality of floating electrodes and the first plurality of active electrodes is equal to the width of the plurality of floating electrodes.

The second varistor may include a plurality of floating electrodes that is distinct from the plurality of floating electrodes of the first varistor. The floating electrodes of the second varistor may be electrically separate from the floating electrodes of the first varistor. For example, the floating electrodes of the second varistor may be spaced apart from the floating electrodes of the first varistor in the lateral direction.

The second varistor may generally be configured similarly to the first varistor. For example, the second varistor can include a first plurality of active electrodes overlapping the plurality of floating electrodes at a first overlapping area. The second varistor can include a second plurality of active electrodes overlapping the plurality of floating electrodes at a second overlapping area.

In some embodiments, the varistor array in accordance with aspects of this disclosure may also exhibit low capacitance. For example, one or more of the varistors of the varistor array may have a capacitance less than about 50 picoFarads ("pF") with a DC bias of 0.0 volts and a 0.5 volt root-mean-squared sinusoidal signal at an operating frequency of 1 MHz, a temperature of about 23° C., and a relative humidity of 25%. For example, in some embodiments, the varistor may have a capacitance less than about 45 pF in the above conditions, in some embodiments less than about 40 pF, in some embodiments less than about 10 pF, and in some embodiments, the varistor may have a capacitance less than about 5 pF in the above conditions, in some embodiments less than about 2 pF, and in some embodiments less than about 1 pF. For example, in some embodiments, the varistor may have a capacitance ranging from about 0.1 pF to about 50 pF, in some embodiments from about 0.1 pF to about 10 pF, in some embodiments from about 0.7 pF to about 7 pF, in some embodiments from about 1 pF to about 5 pF, and in some embodiments from about 0.1 pF to about 1 pF.

A varistor array in accordance with aspects of this disclosure may also exhibit other capacitance values. For example, one or more of the varistors of the varistor array may have a capacitance greater than about 50 ("pF") with a DC bias of 0.0 volts and a 0.5 volt root-mean-squared sinusoidal signal at an operating frequency of 1 MHz, a temperature of about 23° C., and a relative humidity of 25%. For example, in some embodiments, the varistor may have a capacitance greater than about 50 pF in the above conditions, in some embodiments greater than about 75 pF, in some embodiments greater than about 100 pF, in some embodiments greater than about 200 pF, in some embodiments greater than about 300 pF, in some embodiments greater than about 400 pF, and in some embodiments greater than about 500 pF. As further examples, the varistor may have a capacitance greater than about 600 pF in the above conditions, in some embodiments greater than about 750 pF, and in some embodiments greater than about 1000 pF. For instance, in some embodiments, the varistor may have a capacitance ranging from about 50 pF to about 1000 pF, in some embodiments from about 75 pF to about 750 pF, and in some embodiments from about 100 pF to about 500 pF.

In some embodiments, the varistor array and/or one or more varistors of the varistor array may exhibit a low leakage current. For example, the leakage current at an operating voltage of about 30 volts may be less than about 10 microamperes (μA). For example, in some embodiments, the leakage current at an operating voltage of about 30 volts may range from 0.01 μA to about 5 μA, in some embodiments, from about 0.005 μA to about 1 μA, in some embodiments, from about 0.05 μA to about 0.15 μA, e.g., 0.1 μA.

In some embodiments, one or more varistors of the varistor array may have a transient energy capability per unit active volume at least about 0.05 $J/mm^3$ when tested with a 10×1000 μs current wave, in some embodiments at least about 0.1 $J/mm^3$, in some embodiments at least about 0.2 $J/mm^3$, in some embodiments at least about 0.5 $J/mm^3$, and in some embodiments at least about 1.0 $J/mm^3$. The transient energy capability per unit active volume of the one or more varistors can be determined by dividing the transient energy capability of the varistor by the active volume of the varistor. The active volume of the varistor can be defined as an area of the active electrodes multiplied by a number of the active electrodes and multiplied by a thickness of the dielectric layers between the active electrodes.

According to aspects of the present disclosure, the varistor array can exhibit a non-linear resistance response that can divert voltage spikes and/or divert current voltages from damaging nearby or connected electrical components. For example, the varistor array can be configured to provide relatively low current flow for voltages applied across the varistor array that are below a breakdown voltage of the varistor array. As the applied voltage increases over the breakdown voltage, the varistor array may facilitate greater relative current flow through the varistor array, which can prevent or reduce voltage spikes across the varistor array, thereby preventing or reducing voltage spikes for nearby or adjacent components.

For example, the varistor array or one or more varistors of the varistor array can exhibit resistance according to a first resistance curve that is non-linear across a first voltage range, the first voltage range being less than a clamping voltage of the varistor/varistor array, and exhibit resistance according to a second resistance curve that is approximately linear across a second voltage range that is greater than the clamping voltage.

The varistor array may exhibit a non-linear response. A voltage per unit length across the varistor array can vary with respect to a current per unit area through the varistor array. Across a prebreakdown voltage range, the varistor array, or one or more varistors of the varistor array, may generally exhibit a first response curve and may generally exhibit a second response curve across a non-linear voltage range that is greater than the prebreakdown voltage range and less than a clamping voltage. The varistor/varistor array may generally exhibit voltages approximately according to the following relationship:

$$I = \left(\frac{V}{C}\right)^{\alpha}$$

where V represents voltage; I represents current; C is a constant; and α is defined as follows in the nonlinear region:

$$\alpha = \frac{d\ln I}{d\ln V}$$

In the prebreakdown voltage range, the voltage per unit length generally increases faster with respect to the current per unit area through the varistor/varistor array than in the non-linear region. Across an upturn voltage range that is greater than the clamping voltage, the varistor or varistor array may generally exhibit a third response curve, in which the voltage per unit length generally increases faster with respect to the current per unit area through the varistor/varistor array than in the non-linear region.

In some embodiments, a varistor array according to aspects of the present disclosure, or one or more varistors of a varistor array as described herein, may be capable of withstanding repetitive electrostatic discharge strikes without substantial degradation in performance. For example, a breakdown voltage of the varistor array after 5,000 or more electrostatic discharge strikes of about 8,000 volts may be greater than about 0.9 times an initial breakdown voltage of the varistor array, in some embodiments greater than about 0.95 times the initial breakdown voltage, and in some embodiments greater than about 0.98 times the initial breakdown voltage.

The dielectric layers may be pressed together and sintered to form a unitary structure. The dielectric layers may include any suitable dielectric material, such as, for instance, barium titanate, zinc oxide, or any other suitable dielectric material. Various additives may be included in the dielectric material, for example, that produce or enhance the voltage-dependent resistance of the dielectric material. For example, in some embodiments, the additives may include oxides of cobalt, bismuth, manganese, praseodymium, or combinations thereof. In some embodiments, the additives may include oxides of gallium, aluminum, antimony, chromium, titanium, lead, barium, nickel, vanadium, tin, or combinations thereof. The dielectric material may be doped with the additive(s) ranging from about 0.5 mole percent to about 3 mole percent, and in some embodiments from about 1 mole percent to about 2 mole percent. The average grain size of the dielectric material may contribute to the non-linear properties of the dielectric material. In some embodiments, the average grain size may range from about 1 microns to 100 microns, in some embodiments, from about 2 microns to 80 microns.

Figure 1B:
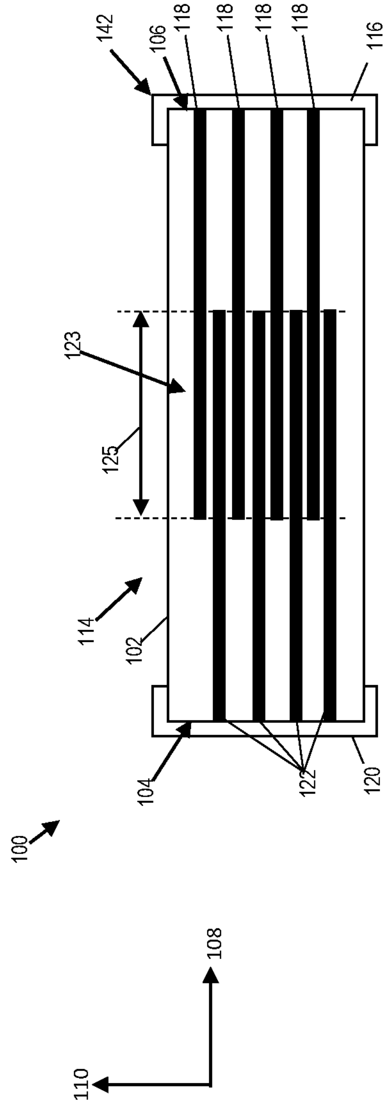
FIG. 1B is a side elevation view of the varistor array of FIG. 1A along section A-A of FIG. 1A.

Reference will now be made in detail to the example embodiments of the multilayer varistor array. Referring now to the drawings, FIG. 1A illustrates a simplified top-down view of a varistor array 100 according to aspects of the present disclosure. FIG. 1B is a side elevation view of the varistor array 100 of FIG. 1A along section A-A of FIG. 1A. The varistor array 100 may include a monolithic body 102 having a first end 106 and a second end 104 that is spaced apart from the first end 106 in a longitudinal direction 108. The monolithic body 102 can include a plurality of dielectric layers stacked in a Z-direction 110 that is perpendicular to the longitudinal direction 108 and a lateral direction 112.

A first varistor 114 may be formed in the monolithic body 102. The first varistor 114 may include a first external terminal 116 on the first end 106 of the monolithic body 102. The first varistor 114 may include a first plurality of electrodes 118 connected with the first external terminal 116. The first varistor 114 may include a second external terminal 120 on the second end 104 of the monolithic body 102. The first varistor 114 may include a second plurality of electrodes 122 connected with the second external terminal 120. The second plurality of electrodes 122 may be interleaved with the first plurality of electrodes 118 and may overlap the first plurality of electrodes 118 at an overlapping area 123 that is insensitive to a relative misalignment between the first plurality of electrodes 118 and the second plurality of electrodes 122 when the misalignment is less than a threshold 127. In this example, the threshold 127 is equal to a one half of a difference between the width 126 of the first plurality of electrodes 118 and the width 128 of the overlapping area 123.

For example, the second plurality of electrodes 122 can have a width 124 in the lateral direction 112 that is less than a width 126 of the first plurality of electrodes 118 in the lateral direction 112 such that a width 128 of the overlapping area 123 between the first plurality of electrodes 118 and the second plurality of electrodes 122 is equal to the width 124 of the second plurality of electrodes 122. Alternatively, the width 124 of the second plurality of electrodes 122 can be greater than the width 126 of the first plurality of electrodes 118 such that the width 128 of the overlapping area 123 between the first plurality of electrodes 118 and the second plurality of electrodes 122 is equal to the width 126 of the first plurality of electrodes 118.

As shown in FIG. 1B, the overlapping area 123 may have a length 125 in the longitudinal direction 108. The length 125 may vary based on, e.g., a length of the first plurality of electrodes 118 in the longitudinal direction 108 and/or a length of the second plurality of electrodes 122 in the longitudinal direction 108.

A second varistor 130 may be formed in the monolithic body 102. The second varistor 130 may be distinct from the first varistor 114. The second varistor 130 may be spaced apart from the first varistor 114 in the lateral direction 112. The second varistor 130 can include a first external terminal 132 on the first end 106 of the monolithic body 120 and a second external terminal 134 on the second end 104 of the monolithic body 102.

The second varistor 130 can include a first plurality of electrodes 136 connected with the first external terminal 132 and a second plurality of electrodes 138 connected with the second external terminal 134. The second plurality of electrodes 138 of the second varistor 130 may overlap the first plurality of electrodes 136 of the second varistor 130 at an overlapping area 140 that is insensitive to a relative misalignment between the first plurality of electrodes of the second varistor and the second plurality of electrodes of the second varistor when the misalignment is less than the threshold 127.

In some embodiments, an area of the overlapping area 123 of the first varistor 114 can be approximately equal to an area of the overlapping area 140 of the second varistor 130. For example, a ratio of an area of the overlapping area 123 of the first varistor 114 to an area of the overlapping area 140 of the second varistor 130 may ranges from about 0.9 to about 1.1.

One or both of the first varistor 114 and the second varistor 130 may exhibit a capacitance of less than 50 pF with a DC bias of 0.0 volts and a 0.5 volt root-mean-squared sinusoidal signal at an operating frequency of 1 MHz, a temperature of about 23° C., and a relative humidity of 25%. For example, the first varistor 114 may exhibit a first capacitance, and the second varistor 130 can exhibit a second capacitance that is within 5% of the first capacitance exhibited by the first varistor 114.

Figure 1D:
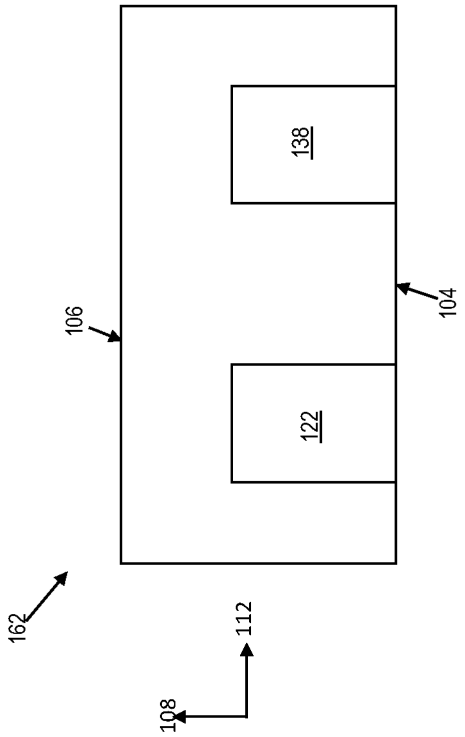
FIG. 1D illustrates a second layer of the varistor array of FIGS. 1A and 1B.
Figure 1C:
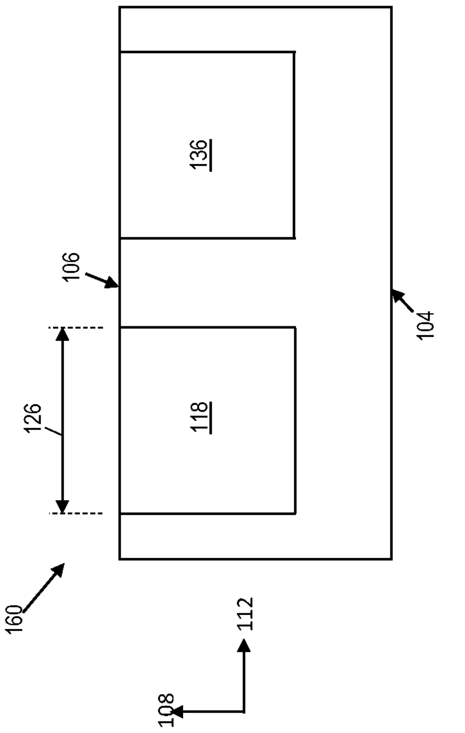
FIG. 1C illustrates a first layer of the varistor array of FIGS. 1A and 1B.

FIGS. 10 and 1D illustrate alternating first layers 160 and second layers 162, respectively of the varistor array 100 of FIGS. 1A and 1B. The first layers 160 can be alternately stacked with the second layer 162 to form the monolithic body 102. In some embodiments, dielectric layers (e.g., without electrodes or other patterned conductive materials) can be arranged between the first layers 160 and second layer 162.

Figure 2A:
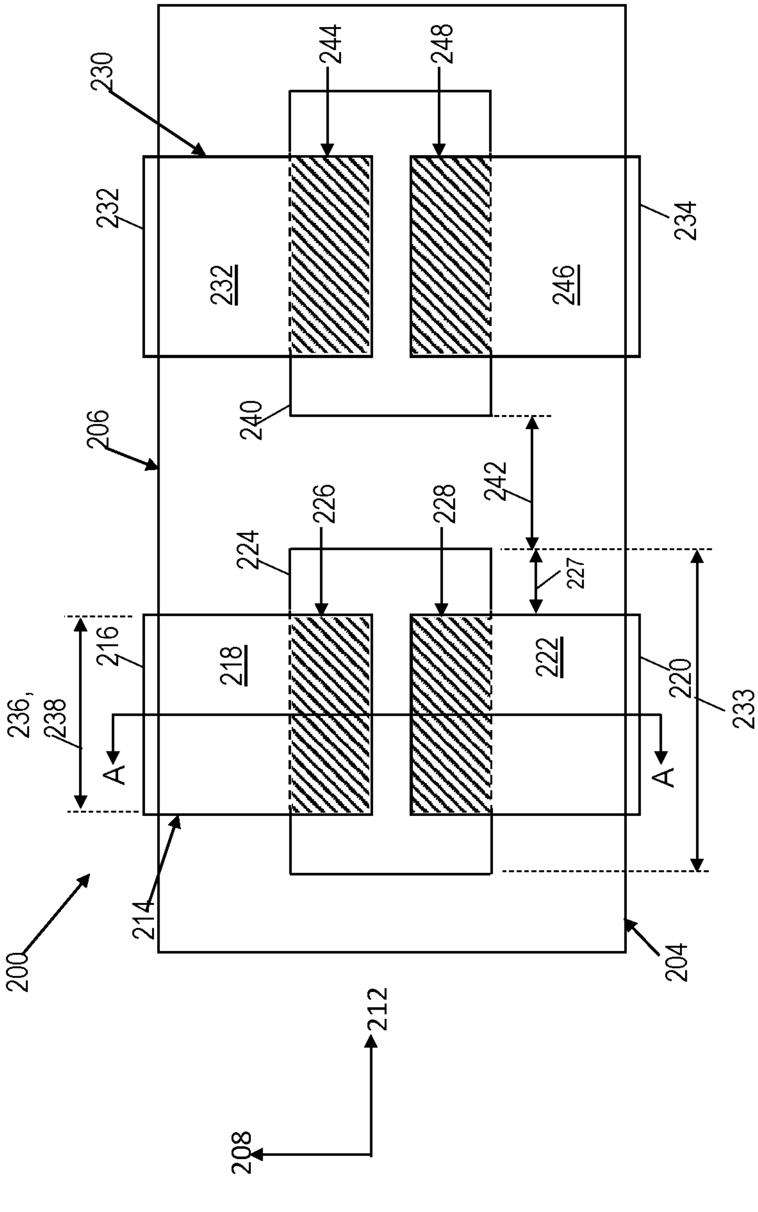
FIG. 2A illustrates a simplified top-down view of a varistor array according to aspects of the present disclosure.
Figure 2B:
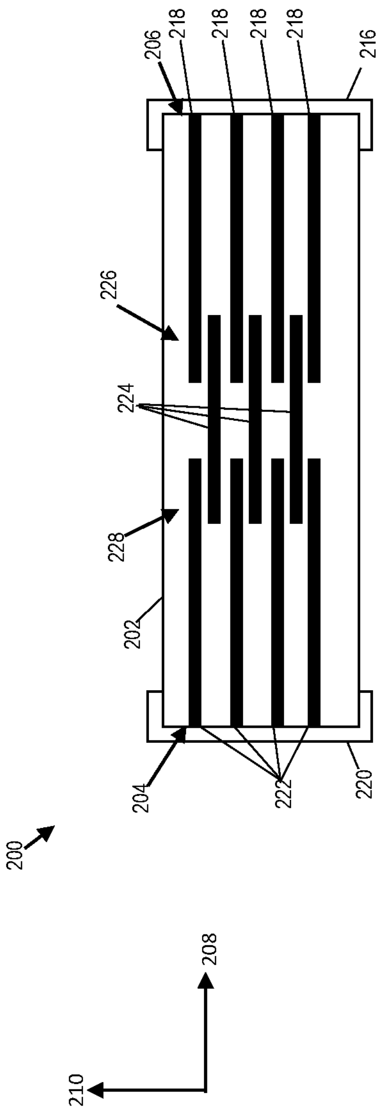
FIG. 2B is a side elevation view of the varistor array of FIG. 2A along section A-A of FIG. 2A.

FIG. 2A illustrates a simplified top-down view of a varistor array 200 according to aspects of the present disclosure. FIG. 2B is a side elevation view of the varistor array 200 of FIG. 2A along section A-A of FIG. 2A. The varistor array 200 can include a monolithic body 202 including a plurality of dielectric layers stacked in a Z-direction 210 that is perpendicular to a longitudinal direction 208. The monolithic body 202 can have a first end 206 and a second end 204 that is spaced apart from the first end 206 in the longitudinal direction 208. A first varistor 214 may be formed in the monolithic body 202. A second varistor 230 may be formed in the monolithic body 202. The second varistor 230 can be distinct from the first varistor 214.

The first varistor 214 can include a first external terminal 216 on the first end 206 of the monolithic body 202 and a first plurality of active electrodes 218 connected with the first external terminal 216. The first varistor 214 can include a second external terminal 220 on the second end 204 of the monolithic body 202. A second plurality of active electrodes 222 may be connected with the second external terminal 220. Respective active electrodes 222 of the second plurality of active electrodes 222 may be co-planar with respective active electrodes 218 of the first plurality of active electrodes 218. A plurality of floating electrodes 224 may overlap the first plurality of active electrodes 218 along a first overlapping area 226 that is insensitive to a relative misalignment between the first plurality of active electrodes 218 and the plurality of floating electrodes 224. The floating electrodes 224 may overlap the second plurality of active electrodes 222 along a second overlapping area 228 that is insensitive to the relative misalignment between the second plurality of active electrodes 222 and the plurality of floating electrodes 224 less than a threshold.

For example, the plurality of floating electrodes 224 may have a width 233 in the lateral direction 212 that is greater than a width 236 of the first plurality of active electrodes 218 in the lateral direction 212 such that a width 238 of the first overlapping area 226 between the plurality of floating electrodes 224 and the first plurality of active electrodes 218 is equal to the width 236 of the first plurality of active electrodes 218. As another example, the width 236 of the first plurality of active electrodes 218 can be greater than the width 233 of the floating electrodes 224, for example as described below with respect to FIG. 3.

In this embodiment, a combined area of the overlapping areas 226, 228 may be insensitive to a relative misalignment between the first and second pluralities of electrodes 218, 222 and the floating electrode 224 when the misalignment is less than a threshold 227 in the lateral direction 212. In this example, the threshold 227 is equal to a one half of a difference between the width 223 of the floating electrodes 224 and the width 236 of the first plurality of electrodes 218. The second plurality of electrodes 222 can generally have the same width 236.

The second varistor 230 may include a plurality of floating electrodes 240 that is distinct from the plurality of floating electrodes 224 of the first varistor 214. The floating electrodes 240 of the second varistor 230 may be electrically separate from the floating electrodes 224 of the first varistor 214. For example, the floating electrodes 240 of the second varistor 230 may be spaced apart from the floating electrodes 224 of the first varistor 214 by a distance 242 in the lateral direction 212. The distance 242 may range from 10% to 200% of the width 238 of the overlapping areas 226, 228.

The second varistor 230 may generally be configured similarly to the first varistor 214. For example, the second varistor 230 can include a first plurality of active electrodes 232 overlapping the plurality of floating electrodes 240 at a first overlapping area 244. The second varistor 230 can include a second plurality of active electrodes 246 overlapping the plurality of floating electrodes 240 at a second overlapping area 248.

Figure 3:
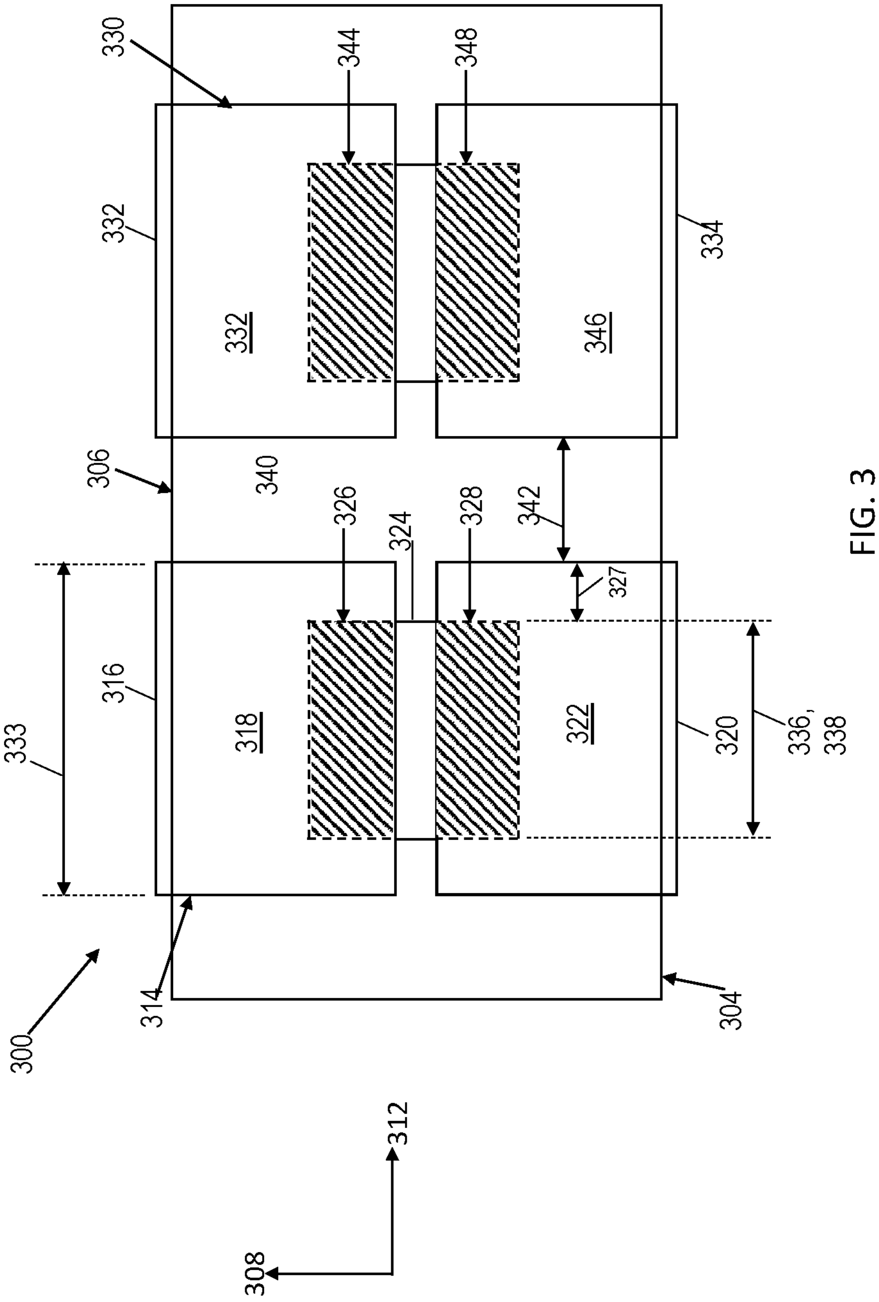
FIG. 3 illustrated another example embodiment of a varistor array according to aspects of the present disclosure.

FIG. 3 illustrated another example embodiment of a varistor array 300 according to aspects of the present disclosure. Similar reference numerals are presented in FIG. 3 as the reference numerals in FIG. 2A. For example, a first varistor 314 can include a first plurality of active electrodes 318, a plurality of floating electrodes 324, and a second plurality of active electrodes 322.

In some embodiments, a plurality of floating electrodes 324 can have a width 336 in the lateral direction 312 that is less than a width 333 of the first plurality of active electrodes 316 in the lateral direction 312 such that a width 338 of a first overlapping area 326 between the plurality of floating electrodes 324 and the first plurality of active electrodes 318 is equal to the width 336 of the plurality of floating electrodes 324.

In this embodiment, a combined area of the overlapping areas 326, 328 may be insensitive to a relative misalignment between the first and second pluralities of electrodes 318, 322 and the floating electrode 324 when the misalignment is less than a threshold 327 in the lateral direction 312. In this example, the threshold 327 is equal to a one half of a difference between the width 336 of the floating electrodes 324 and the width 333 of the first plurality of electrodes 218. The second plurality of electrodes 322 can generally have the same width 333.

Figure 4:
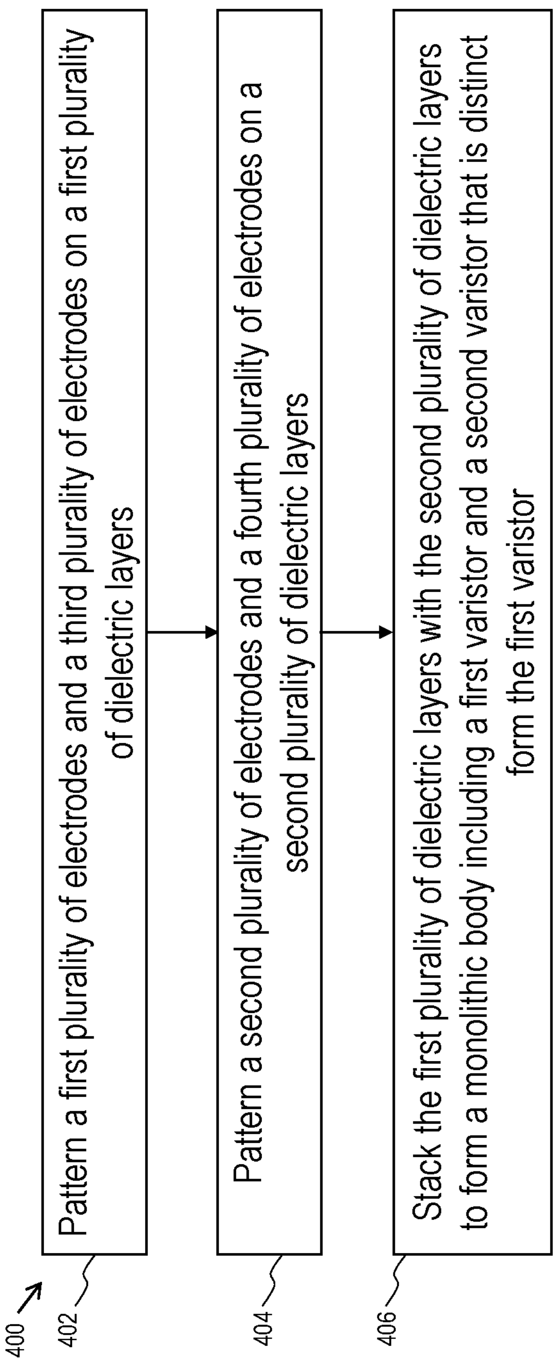
FIG. 4 is a flowchart of a method for forming a varistor array according to aspects of the present disclosure.

FIG. 4 is a simplified flowchart of a method 400 of forming a varistor array. The method can include, at 402, patterning a first plurality of electrodes and a third plurality of electrodes on a first plurality of dielectric layers. For example, referring again to FIG. 10, electrodes 118, 136 can be patterned on the first dielectric layer 160.

The method can include, at 404, patterning a second plurality of electrodes and a fourth plurality of electrodes on a second plurality of dielectric layers. For example, referring again to FIG. 1D, electrodes 122, 138 can be patterned on the second dielectric layer 162.

The method can include, at 406, stacking the first plurality of dielectric layers with the second plurality of dielectric layers to form a monolithic body such that a first varistor is formed between the first plurality of electrodes and the second plurality of electrodes and a second varistor is formed between the third plurality of electrodes and the fourth plurality of electrodes. The second varistor can be distinct from the first varistor. For example, referring again to FIGS. 1A through 1D, the first and second dielectric layers 160, 162 can be alternately stacked to form the monolithic body 102 including varistors 114, 130. External terminations 116, 120, 132, 134 can be formed by plating or other suitable methods.

Applications

The varistor array disclosed herein may find applications in a wide variety of devices. For example, the varistor may be used in communication lines, such as ethernet, in a variety of devices, such as radio frequency antenna and amplifier circuits. The varistor array may be particularly suited for high frequency applications, such as 5G frequencies (e.g., greater than 10 GHz).

The varistor array may also find application in various technologies including laser drivers, sensors, radars, radio frequency identification chips, near field communication, data lines, Bluetooth, optics, Ethernet, and in any suitable circuit. Improved electrical characteristic matching between the varistors of the varistor array facilitate greater communication bandwidth.

The varistor array disclosed herein may also find particular application in the automotive industry. For example, the varistor array may be used in any of the above-described circuits in automotive applications. Improved communication bandwidth can facilitate communication between a greater number of devices on the same communication lines. As a result, the total length and/or number of communication lines within a given vehicle can be greatly reduced.

Test Methods

The following sections provide example methods for testing varistors and/or varistor arrays to determine various varistor characteristics.

Transient Energy Capability

Figure 5:
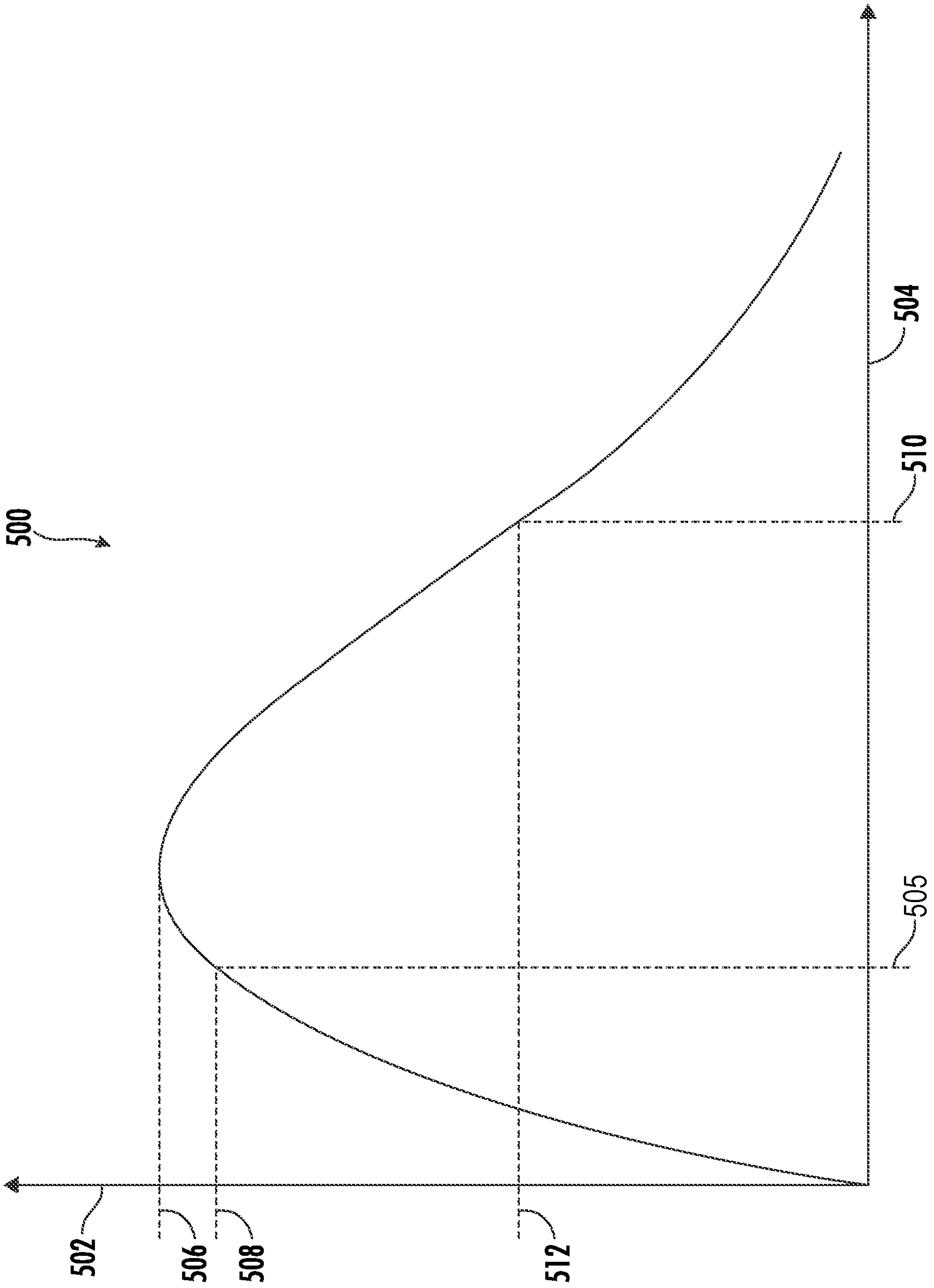
FIG. 5 illustrates a current wave for testing varistors according to ANSI Standard C62.1.

The transient energy capability of a varistor or varistor array as described herein may be measured using a waveform generator and/or pulse generator, such as a Frothingham FEC CV300B. The varistor/varistor array may be subjected to a 10×1000 μs current wave. The peak current value may be empirically selected to determine the maximum energy that the varistor/varistor array is capable of dissipating without failing (e.g., by overheating). An exemplary current pulse or wave is illustrated in FIG. 5. The current (vertical axis 502) is plotted against time (horizontal axis 504). The current increases to the peak current value 506 and then decays. The "rise" time period (illustrated by vertical dotted line 505) is from the initiation of the current pulse (at t=0) to when the current reaches 90% of the peak current value 506 (illustrated by horizontal dotted line 508). The "decay time" (illustrated by vertical dotted line 510) is from the initiation of the current pulse (at t=0) to when the current returns to 50% of the peak current value 506 (illustrated by horizontal dotted line 512). For a 10×1000 μs pulse, the "rise" time is 10 μs and the decay time is 1000 μs.

Figure 6:
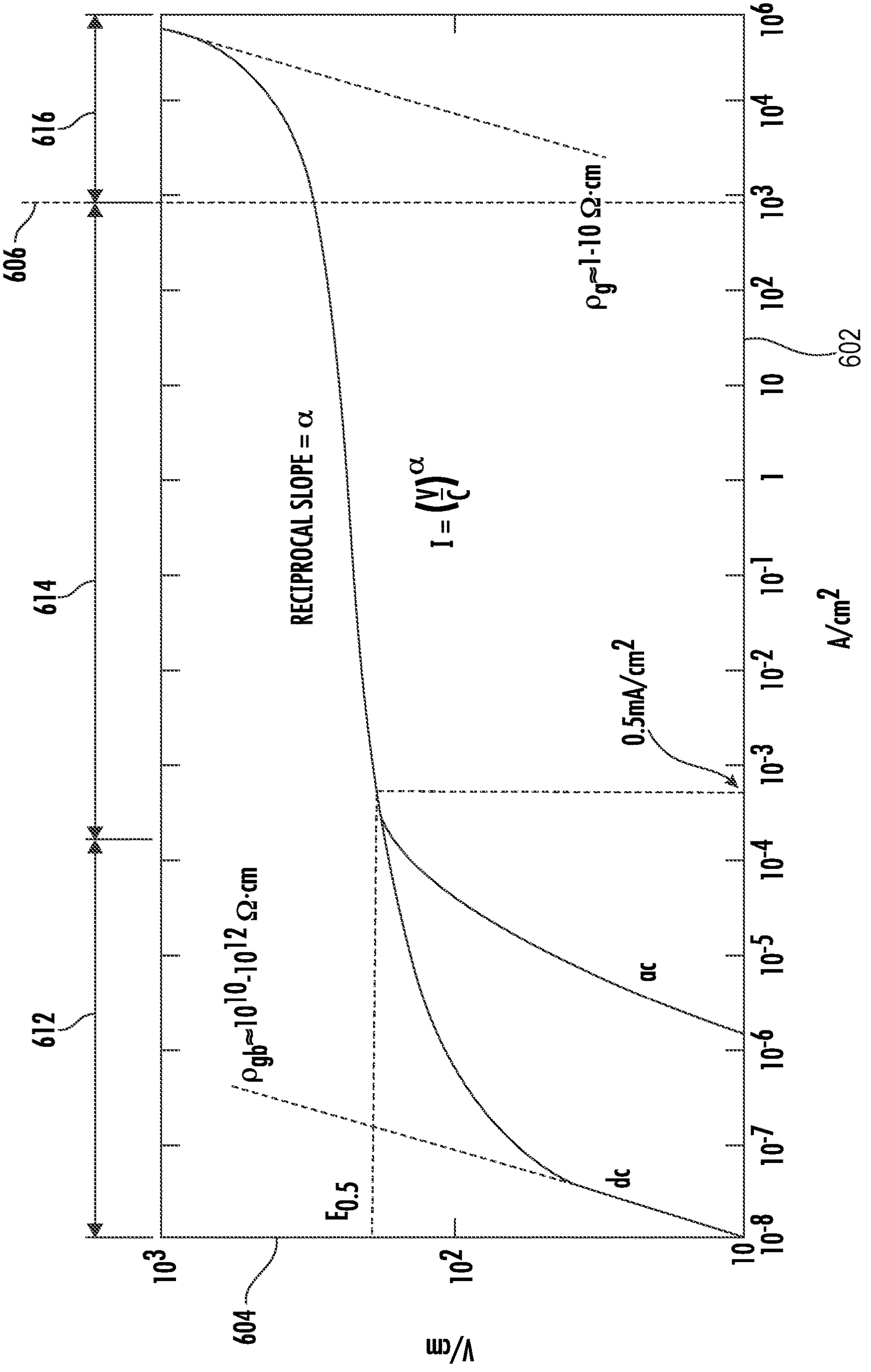
FIG. 6 illustrates a voltage response curve of a varistor according to aspects of the present disclosure.

During a pulse through the varistor or varistor array, the voltage may be measured across the varistor or varistor array. FIG. 6 illustrates an example plot of the current through the varistor or varistor array (horizontal axis 602) against the voltage across the varistor or varistor array (vertical axis 604). FIG. 6 is described in greater detail below.

The transient energy handling capability of the varistor or varistor array according to the present subject matter may be determined by calculating the amount of energy that has passed through the varistor/varistor array. More specifically, the transient energy rating may be calculated by integrating the product of the measured current and the measured voltage with respect to time during the pulse:

$$E=\int IVdt$$

where E is the total energy dissipated by the varistor/varistor array; I is the instantaneous current through the varistor/varistor array; V is the instantaneous voltage across the varistor/varistor array; and t represents time.

Alternatively, a square current pulse of a fixed duration of 2 ms can be applied to the varistor or varistor array using a waveform generator and/or pulse generator, such as a Frothingham FEC CV300B. The current through the varistor/varistor array and voltage across the varistor/varistor array can be detected as described above. The total energy (Joules) absorbed by the varistor/varistor array can be determined based on the measured current and voltage as described above. The current amplitude of the applied square current pulse can be determined based on an active volume of the varistor/varistor array. The active volume of the varistor/varistor array can be defined as an area of the active electrodes multiplied by a number of the active electrodes and multiplied by a thickness of the dielectric layers between the active electrodes.

With either of the above methods of determining transient energy capability of the varistor/varistor array, the transient energy capability per unit active volume of the varistor/varistor array can be determined by dividing the transient energy capability of the varistor/varistor array by the active volume of the varistor/varistor array. The varistor/varistor array may have a transient energy capability per unit active volume of at least about 0.05 J/mm$^3$ when tested with a 10×1000 μs current wave, in some embodiments at least about 0.1 J/mm$^3$, in some embodiments at least about 0.2 J/mm$^3$, in some embodiments at least about 0.5 J/mm$^3$, and in some embodiments at least about 1.0 J/mm$^3$.

Additionally, to determine the electrostatic discharge capabilities of the varistor or varistor array, a series of repetitive electrostatic discharge strikes may be administered. For example, 5,000 or more 8,000 volt electrostatic discharge strikes may be applied to the varistor/varistor array. The breakdown voltage of the varistor/varistor array may be measured (as described below) at regular intervals during this series of strikes. The breakdown voltage of the varistor/varistor array after the electrostatic discharge strikes can be measured and compared with an initial breakdown voltage before the strikes.

Breakdown Voltage

The breakdown voltage of the varistor or varistor array may be measured using a Keithley 2400 series Source Measure Unit (SMU), for example, a Keithley 2410-C SMU. By definition, breakdown voltage is the low current voltage of the varistor/varistor array. Typically, breakdown voltage is measured at a current of 1 milliampere (mA).

Clamping Voltage

The clamping voltage is the transition voltage or the start of the conduction of the varistor/varistor array. The varistor/varistor array may be subjected to an 8/20 μs current wave, for example according to ANSI Standard C62.1 Typically, clamping voltage is measured at a current of 1 ampere (A), 5 A, or 10 A.

Peak Current

The peak current is the maximum current that the varistor/varistor array can withstand, e.g., measured with an 8/20 μs current pulse or other current pulse. An exemplary 8/20 μs, 10/1000 μs, etc. current pulse is illustrated in FIG. 5. The current (vertical axis 502) is plotted against time (horizontal axis 504). The current may increase to the peak current value 506 and then decay. The "rise" time period (illustrated by vertical dotted line 505) may be from the initiation of the current pulse (at t=0) to when the current reaches 90% (illustrated by horizontal dotted line 508) of the peak current value 506. The "rise" time may be, e.g., 8 μs. The "decay time" (illustrated by vertical dotted line 510) may be from the initiation of the current pulse (at t=0) to 50% (illustrated by horizontal dotted line 512) of the peak current value 506. The "decay time" may be, e.g., 20 μs. The clamping voltage is measured as the maximum voltage across the varistor/varistor array during the current wave.

Referring to FIG. 6, the current per unit area through the varistor or varistor array (horizontal axis 602) is plotted against the voltage per unit length across the varistor or varistor array (vertical axis 604). Across a prebreakdown voltage range 612, the varistor/varistor array may generally exhibit a first response curve, and the varistor/varistor array may generally exhibit a second response curve across a non-linear voltage range 614 that is greater than the pre-breakdown voltage range 612 and less than a clamping voltage 606. An ideal varistor/varistor array may generally exhibit voltages approximately according to the following relationship:

$$I = \left(\frac{V}{C}\right)^{\alpha}$$

where V represents voltage; I represents current; C is a constant; and α is defined as follows in the nonlinear region 614:

$$\alpha = \frac{d\ln I}{d\ln V}$$

In the prebreakdown voltage range 612, the voltage per unit length generally increases at a greater rate with respect to the current per unit area through the varistor/varistor array than in the non-linear region 614. Across an upturn voltage range 616 that is greater than the clamping voltage 606, the varistor/varistor array may generally exhibit a third response curve, in which the voltage per unit length generally increases at a greater rate with respect to the current per unit area through the varistor/varistor array than in the non-linear region 614.

Capacitance

The capacitance of the varistors/varistor array may be measured using a Keithley 3330 Precision LCZ meter with a DC bias of 0.0 volts (0.5 volt root-mean-squared sinusoidal signal). The operating frequency is 1 MHz. The temperature is room temperature (~23° C.), and relative humidity is 25%.

These and other modifications and variations of the present invention may be practiced by those of ordinary skill in the art, without departing from the spirit and scope of the present invention. In addition, it should be understood that aspects of the various embodiments may be interchanged both in whole or in part. Further, those of ordinary skill in the art will appreciate that the foregoing description is by way of example only and is not intended to limit the invention so further described in such appended claims.

What is claimed is:

1. A varistor array comprising:

a monolithic body comprising a plurality of dielectric layers stacked in a Z-direction that is perpendicular to a longitudinal direction, the monolithic body having a first end and a second end that is spaced apart from the first end in the longitudinal direction;

a first varistor formed in the monolithic body, the first varistor comprising:

a first external terminal at the first end of the monolithic body;

a first plurality of electrodes connected with the first external terminal;

a second external terminal at the second end of the monolithic body; and a second plurality of electrodes connected with the second external terminal of the first varistor, the second plurality of electrodes interleaved with the first plurality of electrodes and overlapping the first plurality of electrodes at an overlapping area that is insensitive to a relative misalignment between the first plurality of electrodes and the second plurality of electrodes when the misalignment is less than a threshold; and a second varistor formed in the monolithic body, the second varistor distinct from the first varistor, the second varistor comprising:

a first external terminal at the first end of the monolithic body;

a second external terminal at the second end of the monolithic body;

a first plurality of electrodes connected with the first external terminal of the second varistor; and a second plurality of electrodes connected with the second external terminal of the second varistor, the second plurality of electrodes of the second varistor overlapping the first plurality of electrodes of the second varistor at an overlapping area that is insensitive to a relative misalignment between the first plurality of electrodes of the second varistor and the second plurality of electrodes of the second varistor when the misalignment is less than the threshold.

2. The varistor array of claim 1, wherein the second plurality of electrodes of the first varistor have a width in the lateral direction that is greater than a width of the first plurality of electrodes of the first varistor in the lateral direction such that a width of the overlapping area between the first plurality of electrodes of the first varistor and the second plurality of electrodes of the first varistor is equal to the width of the first plurality of electrodes of the first varistor.

3. The varistor array of claim 1, wherein a ratio of the overlapping area of the first varistor to the overlapping area of the second varistor ranges from 0.9 to 1.1.

4. The varistor array of claim 1, wherein the first varistor exhibits a capacitance of less than 50 pF with a DC bias of 0.0 volts and a 0.5 volt root-mean-squared sinusoidal signal at an operating frequency of 1 MHz, a temperature of about 23° C., and a relative humidity of 25%.

5. The varistor array of claim 4, wherein the second varistor exhibits a second capacitance with a DC bias of 0.0 volts and a 0.5 volt root-mean-squared sinusoidal signal at an operating frequency of 1 MHz, a temperature of about 23° C., and a relative humidity of 25%, wherein the second capacitance exhibited by the second varistor is within 5% of the first capacitance exhibited by the first varistor.

6. The varistor array of claim 1, wherein the varistor array exhibits resistance according to a resistance curve that is non-linear.

7. The varistor array of claim 1, wherein a breakdown voltage of the varistor array after 5,000 or more electrostatic discharge strikes of about 8,000 volts is greater than about 0.9 times an initial breakdown voltage of the varistor array.

8. The varistor array of claim 1, wherein the varistor array has a transient energy capability per unit active volume of at least about 0.05 J/mm3 when tested with a 10×1000 μs current wave.

9. The varistor array of claim 1, wherein the plurality of dielectric layers comprises zinc oxide.

10. The varistor array of claim 1, wherein the plurality of dielectric layers comprises oxides of at least one of the cobalt, bismuth, praseodymium, or manganese.

11. The varistor array of claim 1, wherein the plurality of dielectric layers comprises an average grain size ranging from about 1 micron to about 100 microns.

12. A varistor array comprising:

a monolithic body comprising a plurality of dielectric layers stacked in a Z-direction that is perpendicular to a longitudinal direction, the monolithic body having a first end and a second end that is spaced apart from the first end in the longitudinal direction;

a first varistor formed in the monolithic body; and a second varistor formed in the monolithic body and distinct from the first varistor;

wherein the first varistor comprises:

a first external terminal on the first end of the monolithic body;

a first plurality of active electrodes connected with the first external terminal;

a second external terminal on the second end of the monolithic body;

a second plurality of active electrodes connected with the second external terminal, wherein respective active electrodes of the second plurality of active electrodes are co-planar with respective active electrodes of the first plurality of active electrodes; and a plurality of floating electrodes overlapping the first plurality of active electrodes along a first overlapping area that is insensitive to a relative misalignment between the first plurality of active electrodes and the plurality of floating electrodes, and wherein the floating electrodes overlap the second plurality of active electrodes along a second overlapping area that is insensitive to the relative misalignment between the second plurality of active electrodes and the plurality of floating electrodes less than a threshold.

13. The varistor array of claim 12, wherein the plurality of floating electrodes has a width in the lateral direction that is greater than a width of the first plurality of active electrodes in the lateral direction such that a width of the first overlapping area between the plurality of floating electrodes and the first plurality of active electrodes is equal to the width of the first plurality of active electrodes.

14. The varistor array of claim 12, wherein the plurality of floating electrodes has a width in the lateral direction that is less than a width of the first plurality of active electrodes in the lateral direction such that a width of the first overlapping area between the plurality of floating electrodes and the first plurality of active electrodes is equal to the width of the plurality of floating electrodes.

15. The varistor array of claim 12, wherein the second varistor comprises a plurality of floating electrodes that is distinct from the plurality of floating electrodes of the first varistor.

16. The varistor array of claim 15, wherein the second varistor comprises:

a first external terminal on the first end of the monolithic body;

a first plurality of active electrodes connected with the first external terminal of the second varistor;

a second external terminal on the second end of the monolithic body;

a second plurality of active electrodes connected with the second external terminal of the second varistor, wherein respective active electrodes of the second plurality of active electrodes of the second varistor are co-planar with respective active electrodes of the first plurality of active electrodes of the second varistor, and wherein the plurality of floating electrodes of the second varistor overlap the first plurality of active electrodes of the second varistor along a first overlapping area that is insensitive to a relative misalignment between the first plurality of active electrodes of the second varistor and the plurality of floating electrodes of the second varistor.

17. The varistor array of claim 12, wherein the first varistor exhibits a capacitance of less than 50 pF with a DC bias of 0.0 volts and a 0.5 volt root-mean-squared sinusoidal signal at an operating frequency of 1 MHz, a temperature of about 23° C., and a relative humidity of 25%.

18. The varistor array of claim 17, wherein the second varistor exhibits a second capacitance with a DC bias of 0.0 volts and a 0.5 volt root-mean-squared sinusoidal signal at an operating frequency of 1 MHz, a temperature of about 23° C., and a relative humidity of 25%, wherein the second capacitance exhibited by the second varistor is within 5% of the capacitance exhibited by the first varistor.

19. A method of forming a varistor array comprising:

patterning a first plurality of electrodes and a third plurality of electrodes on a first plurality of dielectric layers;

patterning a second plurality of electrodes and a fourth plurality of electrodes on a second plurality of dielectric layers;

stacking the first plurality of dielectric layers with the second plurality of dielectric layers to form a monolithic body such that a first varistor is formed between the first plurality of electrodes and the second plurality of electrodes and a second varistor is formed between the third plurality of electrodes and the fourth plurality of electrodes, the second varistor being distinct from the first varistor, the monolithic body having a first end and a second end that is spaced apart from the first end in the longitudinal direction;

forming a first external terminal of the first varistor at the first end of the monolithic body and a second external terminal of the first varistor at the second end of the monolithic body; and forming a first external terminal of the second varistor at the first end of the monolithic body and a second external terminal of the second varistor at the second end of the monolithic body wherein the first plurality of electrodes of the first varistor are connected with the first external terminal of the first varistor and the second plurality of electrodes of the first varistor are connected with the second external terminal of the first varistor, the second plurality of electrodes interleaved with the first plurality of electrodes and overlapping the first plurality of electrodes at an overlapping area that is insensitive to a relative misalignment between the first plurality of electrodes and the second plurality of electrodes when the misalignment is less than a threshold, and wherein the third plurality of electrodes of the second varistor are connected with the first external terminal of the second varistor and the fourth plurality of electrodes of the second varistor are connected with the second external terminal of the second varistor, the fourth plurality of electrodes overlapping the third plurality of electrodes at an overlapping area that is insensitive to a relative misalignment between the third plurality of electrodes and the fourth plurality of electrodes when the misalignment is less than the threshold.

20. A varistor array comprising:

a monolithic body comprising a plurality of dielectric layers stacked in a Z-direction that is perpendicular to a longitudinal direction, the monolithic body having a first end and a second end that is spaced apart from the first end in the longitudinal direction;

a first varistor formed in the monolithic body, the first varistor comprising:

a first external terminal at the first end of the monolithic body and a second external terminal at the second end of the monolithic body;

a first plurality of electrodes connected with the first external terminal; and a second plurality of electrodes connected with the second external terminal, the second plurality of electrodes interleaved with the first plurality of electrodes and overlapping the first plurality of electrodes at a first overlapping area; and a second varistor formed in the monolithic body, the second varistor distinct from the first varistor and comprising:

a first external terminal at the first end of the monolithic body and a second external terminal at the second end of the monolithic body;

a first plurality of electrodes connected with the first external terminal; and a second plurality of electrodes connected with the second external terminal, the second plurality of electrodes of the second varistor overlapping the first plurality of electrodes of the second varistor at a second overlapping area;

wherein a ratio of the first overlapping area to the second overlapping area ranges from 0.9 to 1.1.

21. A varistor array comprising:

a monolithic body comprising a plurality of dielectric layers stacked in a Z-direction that is perpendicular to a longitudinal direction, the monolithic body having a first end and a second end that is spaced apart from the first end in the longitudinal direction;

a first varistor formed in the monolithic body; and a second varistor formed in the monolithic body and distinct from the first varistor;

wherein the first varistor comprises:

a first external terminal on the first end of the monolithic body;

a first plurality of active electrodes connected with the first external terminal;

a second external terminal on the second end of the monolithic body;

a second plurality of active electrodes connected with the second external terminal, wherein respective active electrodes of the second plurality of active electrodes are co-planar with respective active electrodes of the first plurality of active electrodes; and a plurality of floating electrodes overlapping the first plurality of active electrodes along a first overlapping area, and wherein the floating electrodes overlap the second plurality of active electrodes along a second overlapping area;

wherein a ratio of the first overlapping area to the second overlapping area ranges from 0.9 to 1.1.

* * * * *